United States Patent [19]

Rubenzik

[11] Patent Number: 5,108,123
[45] Date of Patent: Apr. 28, 1992

[54] VEHICLE DOCKING DEVICE USING SENSOR MATRIX

[76] Inventor: Robert Rubenzik, 315 W. Northview, Phoenix, Ariz. 85021

[21] Appl. No.: 681,766

[22] Filed: Apr. 8, 1991

[51] Int. Cl.⁵ .............................................. B60D 1/06
[52] U.S. Cl. ................................... 280/477; 280/511; 280/DIG. 14; 340/431
[58] Field of Search .............. 280/477, 511, DIG. 14, 280/420, 422, 432; 340/431, 438, 686, 988

[56] References Cited

U.S. PATENT DOCUMENTS

| | | | |
|---|---|---|---|
| 2,797,406 | 6/1957 | Tanis et al. | 280/477 X |
| 3,418,628 | 12/1968 | Fenner | 280/511 X |
| 3,605,088 | 9/1971 | Savelli | 340/431 |
| 3,825,921 | 7/1974 | Marus et al. | 280/477 X |
| 3,924,257 | 12/1975 | Roberts | 280/477 X |
| 4,187,494 | 2/1980 | Jessee | 340/686 X |
| 4,199,756 | 4/1980 | Dito | 340/431 X |
| 4,432,563 | 2/1984 | Pitcher | 280/477 |
| 4,552,376 | 11/1985 | Cofer | 280/477 |
| 4,852,901 | 8/1989 | Beasley et al. | 280/477 |
| 4,854,604 | 8/1989 | Stallsworth | 280/477 |

Primary Examiner—Joseph E. Valenza
Assistant Examiner—Dean A. Reichard
Attorney, Agent, or Firm—Cahill, Sutton & Thomas

[57] ABSTRACT

A vehicle docking device includes a matrix of sensors arranged in a planar array of rows and columns spaced apart from one another. The matrix of sensors is mounted proximate the hitch ball of the towing vehicle in a horizontal plane. An activator is supported in a predetermined position relative to the towing hitch of the vehicle to be towed for activating one of the sensors closest thereto. The activator is positioned to be directed at the center point of the sensor matrix when the hitch ball is directly under the towing hitch. The sensor matrix is electrically coupled to a corresponding array of indicators disposed near the driver of the towing vehicle. Each indicator is associated with a corresponding sensor. By observing the array of indicators, the driver can determine whether the hitch ball and towing hitch are aligned, or in what direction correction is required.

16 Claims, 2 Drawing Sheets

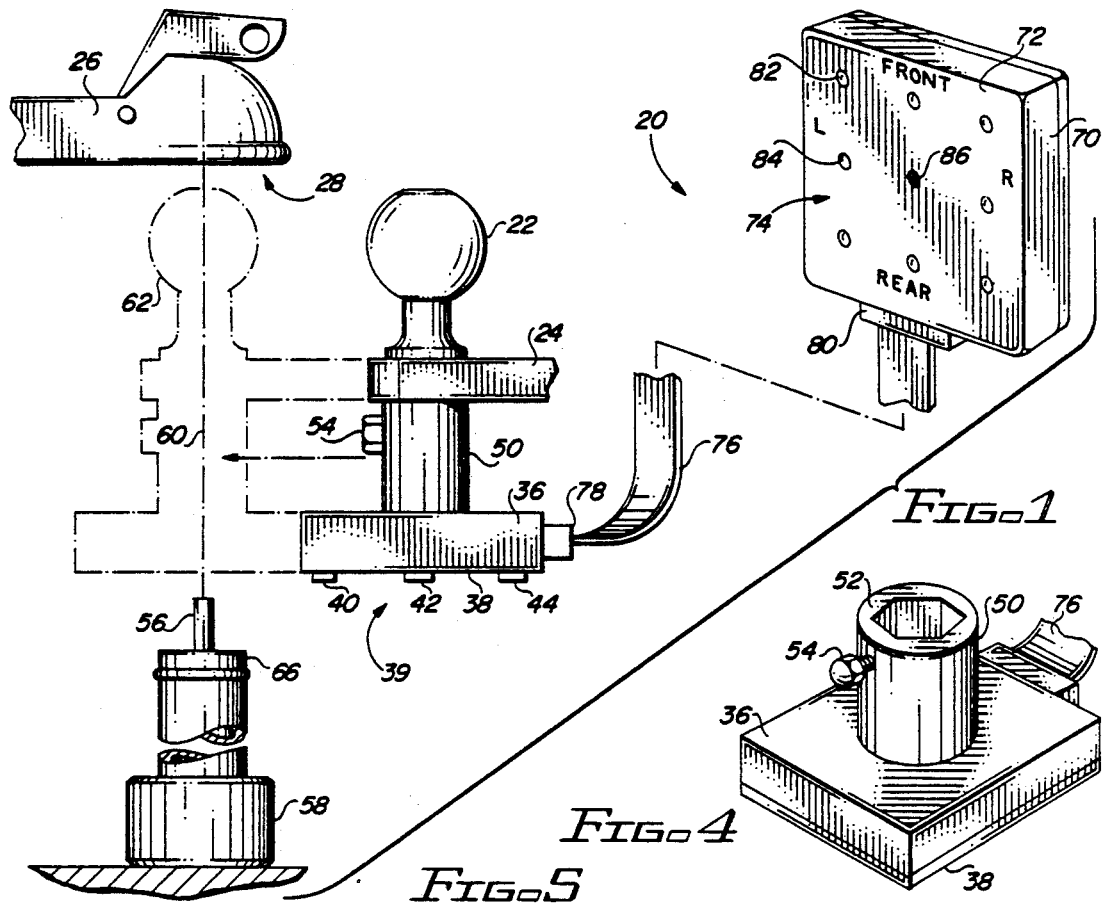
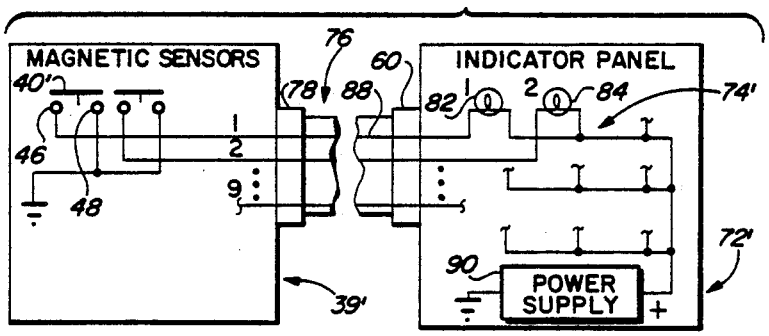
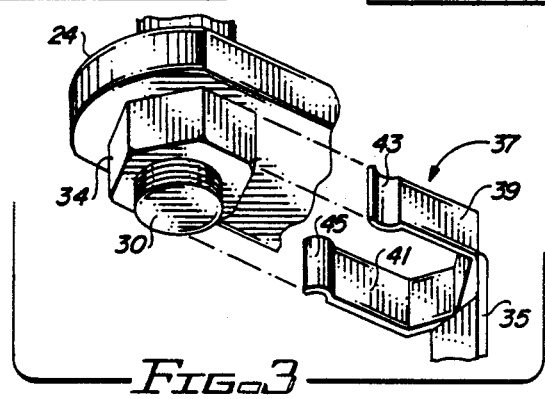
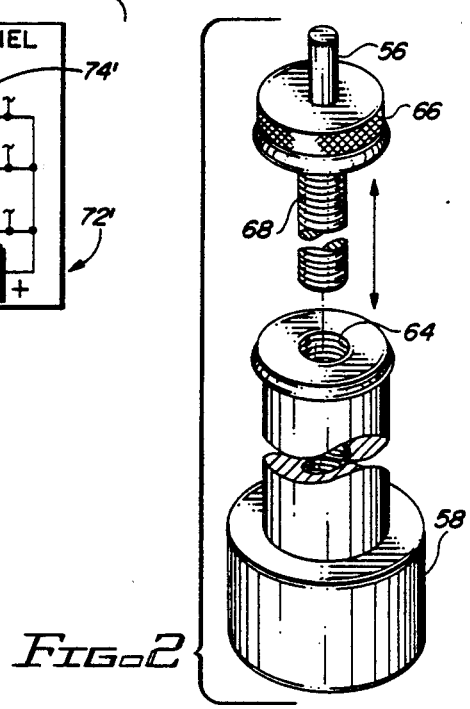

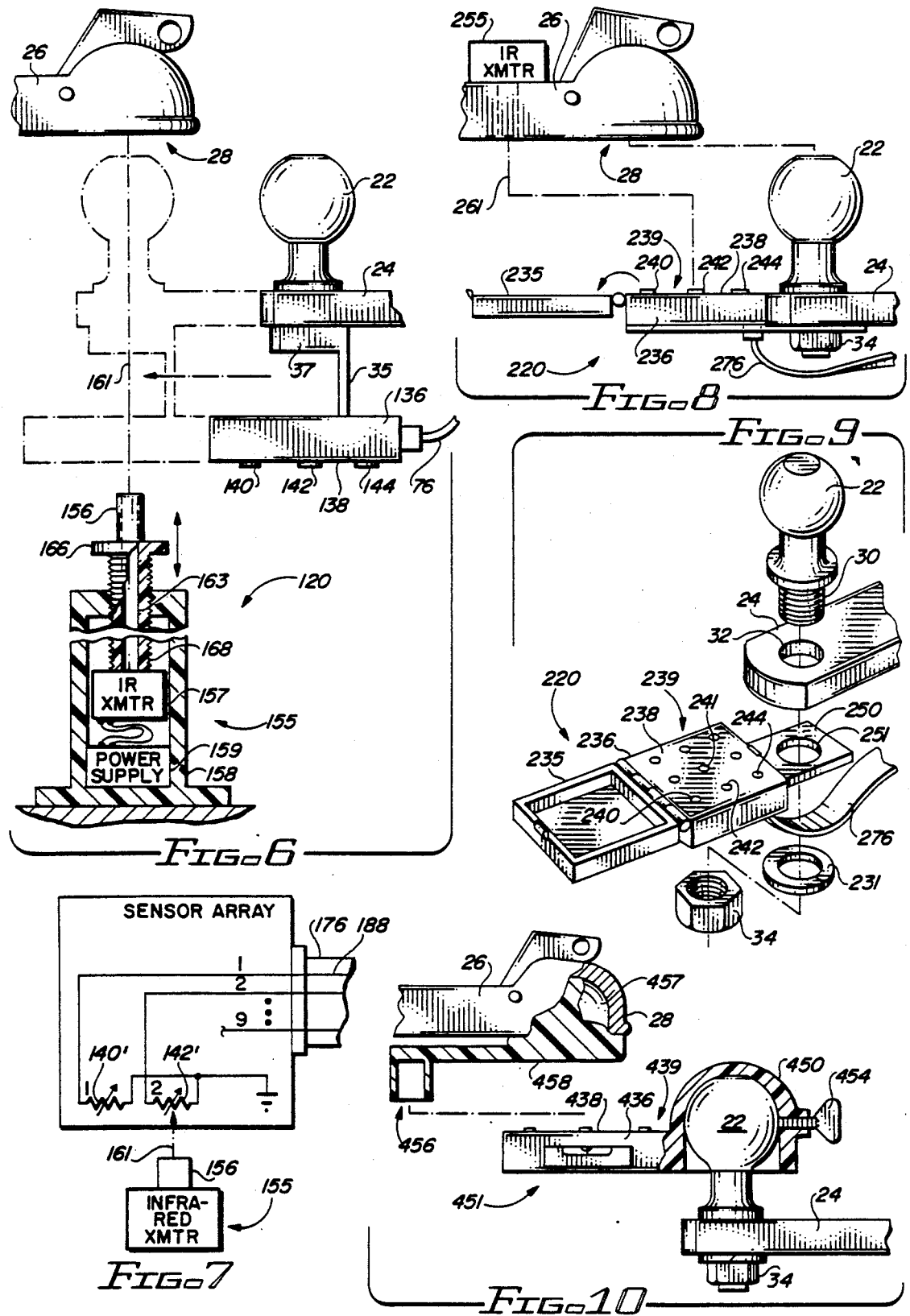

VEHICLE DOCKING DEVICE USING SENSOR MATRIX

BACKGROUND OF THE INVENTION

1. Field of the Invention

The present invention relates generally to apparatus for assisting the driver of a towing vehicle in properly aligning the towing vehicle relative to the towing hitch of a vehicle to be towed, and more particularly, to such an apparatus using a plurality of sensors and indicators to indicate to the driver the position of the towing vehicle hitch ball relative to the towing hitch of the vehicle to be towed.

2. Description of the Prior Art

In those instances when a trailer, such as a boat trailer or house trailer, is to be towed, it is necessary to couple the towing hitch of the trailer, or other vehicle to be towed, with the hitch ball or similar mating element of the towing vehicle. The most common method used is to first raise the towing hitch end of the trailer to an elevated position, and to then drive the towing vehicle backward toward the trailer until the hitch ball of the towing vehicle is directly below the towing hitch of the trailer. The towing hitch end of the trailer may then be lowered onto and secured with the hitch ball for allowing the towing operation to be performed.

In the past, it has been common for the driver of the towing vehicle to require the assistance of a second person who stands outside the towing vehicle and adjacent the trailer in order to direct the driver using verbal or visual commands. The driver must know how far to back up or pull forward to produce proper longitudinal alignment between the hitch ball and the towing hitch. The driver must also know whether to steer to the left or to the right in order to produce proper lateral alignment between the hitch ball and the towing hitch. While such assistance from a second person ultimately produces the desired alignment, the driver is still unable to directly visualize the relative positions of the hitch ball and the towing hitch; as a result, the commands issued by the assistant are often misinterpreted by the driver due to this inability to visualize the relative positions of the towing vehicle and the trailer.

When an assistant is not available, the procedure of docking the vehicle to the trailer is very time consuming, often requiring that the driver leave the vehicle repeatedly to walk to the back of the vehicle to inspect the relationship between the vehicle and the trailer and to determine what corrections in steering and backing are required.

Those skilled in the art have attempted in the past to provide various apparatus to assist the driver of the towing vehicle in guiding the vehicle into proper alignment with the trailer. For example, in U.S. Pat. No. 2,797,406 to Tanis et al., electrical conducting members positioned upon the towing vehicle ahead of the hitch ball are adapted to be contacted by the tongue of the trailer hitch for indicating whether the trailer hitch is centered with, to the right of, or to the left of, the hitch ball. Three electric lights are mounted upon the dashboard of the towing vehicle and are electrically coupled to the electrical conducting members for indicating the lateral position of the trailer hitch relative to the hitch ball. A disadvantage of such apparatus is that the driver does not know how close he is to the trailer until the towing vehicle has physically contacted the tongue of the trailer hitch.

U.S. Pat. No. 3,418,628 issued to Fenner discloses an apparatus which attaches to the trailer hitch of the trailer. Display lights are supported at an elevated position for viewing by the driver through the rear window of the towing vehicle. Downwardly depending tongues extend from the device for being contacted by the hitch ball and are electrically coupled to the display lights for indicating that the hitch ball is centered with, to the left of, or to the right of, the trailer hitch.

U.S. Pat. No. 3,825,921 issued to Marus et al. discloses a device for indicating the relative angular position between a towing vehicle and a trailer. Such device is not used to dock a vehicle with a trailer, but rather to advise the driver of the relative angular relationship between the towing vehicle and the trailer after they have been coupled together.

U.S. Pat. No. 3,924,257 issued to Roberts discloses a trailer hitch guide which includes a transmitter mounted to the trailer and a receiver unit mounted to the towing vehicle. The receiver unit operates both as a direction indicator as well as a proximity indicator.

U.S. Pat. No. 4,199,756 issued to Dito discloses a guide apparatus for a trailer hitch including a telescoping arm which is mounted to the trailer hitch and which extends laterally therefrom beyond the side of the towing vehicle. A pointer is magnetically secured to the side of the towing vehicle, and the driver attempts to align the pointer with the end of the arm. A downwardly depending bar operates a microswitch to activate a buzzer when the hitch ball contacts the bar.

U.S Pat. No. 4,432,563 issued to Pitcher discloses a hitching guidance device including a hitch ball unit adapted to be mounted to the hitch ball of the towing vehicle, as well as a clamp mounted to the trailer hitch cup. A wire extends from the clamp to a retractable reel in the hitch ball unit. A series of contact switches within the hitch ball unit are contacted by the wire to sense that the towing vehicle is too far left or too far right, and also to sense when the hitch cup is directly below the hitch ball. A light indicator unit coupled to the hitch ball unit is mounted in the driver's compartment to guide the driver.

U.S. Pat. No. 4,552,376 issued to Cofer discloses a trailer hitch guide wherein a focused light beam is mounted to the trailer tongue and directed toward the tailgate of a towing truck. A translucent panel is mounted above the tailgate of the truck, and a target spot is indicated upon the translucent panel. The light beam illuminates the target spot of the translucent panel when the hitch ball is directly below the socket of the hitch tongue of the trailer.

U.S. Pat. No. 4,852,901 issued to Beasley et al. discloses a trailer hitch positioning apparatus wherein a first infrared light beam is directed from the trailer toward the towing vehicle. Spaced sensors are mounted on the towing vehicle to detect whether the first beam is directed at the center, or to the left or right of center, of the towing vehicle. A second infrared beam is directed from the trailer hitch down toward the ground. The second beam is intercepted by a sensor when the hitch ball is directly below the hitch tongue of the trailer. An indicator unit is mounted on the dashboard and includes three indicator lights for direction, and a stop light activated when the hitch ball lies below the hitch tongue.

Many of the aforementioned devices fail to provide the driver with advance warning that the hitch ball is approaching the trailer hitch; i.e., such devices do not signal the driver to slow down or stop until the hitch ball is already under the trailer hitch.

Still others of the aforementioned devices fail to signal the driver that the towing vehicle is too far left or too far right until the hitch ball is directly adjacent the trailer hitch.

Many of the devices described above use expensive components which increase the cost to manufacture such products commercially. Some of the devices use mechanical components subject to wear and tear. In addition, several of such devices are either difficult to properly secure to the towing vehicle or trailer, or require significant assembly time to properly align and/or calibrate.

Accordingly, it is an object of the present invention to provide a vehicle docking device for aiding the driver of the towing vehicle in properly positioning the hitch ball of the towing vehicle relative to the trailer hitch of the vehicle to be towed.

It is another object of the present invention to provide such a vehicle docking device which assists the driver of the towing vehicle in visualizing the relative positions of the hitch ball and trailer hitch without having to leave the driver's compartment of the towing vehicle, and which produces a two-dimensional graphical image illustrating the position of the hitch ball relative to the position of the trailer hitch.

It is still another object of the present invention to provide such a vehicle docking device which permits the driver of the towing vehicle to properly position the hitch ball of the towing vehicle relative to the trailer hitch of the vehicle to be towed without requiring the assistance of a second person.

It is yet another object of the present invention to provide the driver with advance warning that the hitch ball is approaching the trailer hitch for allowing the driver sufficient time to slow down, or stop, the towing vehicle before the hitch ball advances beyond the mating tongue of the trailer hitch.

A further object of the present invention is to provide such a vehicle docking device capable of signalling the driver that the hitch ball of the towing vehicle is too far left or too far right of the towing hitch before the hitch ball is directly adjacent the trailer hitch.

A still further object of the present invention is to provide such a guidance device which may be manufactured of relatively inexpensive components to minimize production costs and selling price, while avoiding any requirement for moving parts or physical contact between the towing vehicle and the trailer hitch in order to minimize wear and/or mechanical failure Another object of the present invention is to provide such a vehicle docking device which may be easily secured to the towing vehicle and the trailer with minimum setup time, and which may be easily and quickly removed after the hitch ball has been aligned with the trailer hitch.

These and other objects of the present invention will become more apparent to those skilled in the art as the description of the present invention proceeds.

SUMMARY OF THE INVENTION

Briefly described, and in accordance with the preferred embodiments thereof, the present invention relates to a vehicle docking device for aiding the driver of the towing vehicle in properly positioning the hitch ball of the towing vehicle relative to the trailer hitch of the vehicle to be towed, wherein a matrix of sensors are spaced apart from one another and disposed in a substantially common plane. The matrix of sensors are arranged to lie in an array of rows and columns extending substantially perpendicular to each other. The matrix of sensors is adapted to be secured to the hitch ball by a mounting mechanism for causing the matrix of sensors to lie in a substantially horizontal plane.

An activating mechanism for activating a selected one of the sensors is also provided. Each of the sensors is adapted to generate an electrical signal when activated by the activating mechanism. The activating mechanism is supported by a support mechanism in a predetermined position relative to the towing hitch of the vehicle to be towed. This predetermined position is substantially aligned with the center of the sensor matrix when the hitch ball is directly aligned with the trailer hitch of the vehicle to be towed.

A matrix of indicators are arranged in an array of rows and columns corresponding in number and arrangement to the aforementioned sensor matrix. Such matrix of indicators may be disposed in a location that is conveniently viewed by the driver of the towing vehicle. The matrix of indicators is electrically coupled to the sensor matrix, each of the indicators being responsive to the electrical signal generated by a corresponding one of the sensors for providing a visual, graphic indication to the driver as to the relative position of the trailer hitch within the sensor matrix plane.

In a first embodiment of the present invention, the sensors are magnetically-activated electrical switches, and the activating mechanism is a magnet. In a second embodiment, the sensors are photosensitive variable-resistive elements, while the activating mechanism is a focused beam of light. The matrix of indicators is preferably an array of light-emitting diodes, though incandescent light bulbs or other visual indicators may be used.

Preferably, the number of rows and number of columns in both the sensor matrix and the indicator matrix are each an odd number, such that a sensor and a corresponding indicator lie at the center of the sensor matrix and at the center of the indicator matrix, respectively, to confirm that the hitch ball has been properly aligned with the trailer hitch.

. The electrical coupling between the sensor matrix and the indicator matrix may simply be a series of wires each forming a series connection between each sensor, a corresponding one of the indicators, and a battery.

The mounting of the sensor matrix to the towing vehicle, and the support of the activating means relative to the trailer hitch of the vehicle to be towed, may be achieved in various manners. In a first embodiment, the sensor matrix is supported directly below the hitch ball, as by being clamped to the hex nut used to secure the hitch ball to the towing vehicle, and the activating means is supported upon the ground directly below the mating tongue of the trailer hitch. The support mechanism may include a height adjustment mechanism for supporting the activating mechanism at a desired distance above the ground relative to the height of the sensor matrix.

The mounting mechanism may alternately include a surrogate ball socket for engaging the hitch ball of the towing vehicle in mechanism may include a surrogate hitch ball for being secured within the ball-receiving socket of the trailer hitch to support the activating means therefrom. In this instance, the mounting mechanism and support mechanism may laterally displace the center point of the sensor matrix from the hitch ball, and may laterally displace the activating means from the ball-receiving socket of the trailer hitch, by corresponding amounts.

BRIEF DESCRIPTION OF THE DRAWINGS

FIG. 1 is a perspective view of a vehicle docking device in accordance with a first embodiment of the present invention and including a sensor matrix mounted below the hitch ball of the towing vehicle, an activator positioned directly below the ball-receiving socket to a trailer hitch, and an indicator matrix viewed by the driver of the towing vehicle.

FIG. 2 is a perspective view of an activator, in the form of a magnet, as well as a base unit for supporting the magnet upon the ground at an adjustable height.

FIG. 3 is a partial perspective view of the underside of the hitch ball secured to the towing vehicle and illustrating an alternate embodiment of a clamping member for securing the sensor matrix therebelow.

FIG. 4 is a perspective view of an alternate mounting device for securing the sensor matrix below the hitch ball of the towing vehicle.

FIG. 5 is a schematic drawing showing, in abbreviated form, a matrix of magnetic sensors electrically coupled with the matrix of indicators, each magnetic sensor being coupled in series with one of the indicators and a power supply, such as a battery.

FIG. 6 is a cut-away side view illustrating an activator in the form of an infrared focused light beam directed upwardly toward the ball-receiving socket of the trailer hitch, as well as a sensor matrix of infrared photosensitive elements supported below the hitch ball of the towing vehicle.

FIG. 7 is a schematic drawing of the components shown in FIG. 6, including the infrared light beam and the matrix of infrared photosensitive elements.

FIG. 8 is a side view of an alternate embodiment of the present invention including an infrared transmitter directing a light beam downwardly toward the ground and supported by the trailer hitch, as well as a sensor matrix of infrared photosensitive elements mounted to and extending laterally from the hitch ball of the towing vehicle.

FIG. 9 is an exploded perspective view of the sensor matrix and hitch ball shown in FIG. 8 and illustrating the manner of mounting the sensor matrix to the hitch ball of the towing vehicle.

FIG. 10 is a side view of yet another embodiment of the present invention wherein an activator is secured within the ball-receiving socket of the trailer hitch, and wherein the sensor matrix extends laterally from the hitch ball and is mounted thereto by a surrogate ball-receiving socket.

DETAILED DESCRIPTION OF THE PREFERRED EMBODIMENTS

Within FIG. 1, a vehicle docking device is shown constructed in accordance with a first embodiment of the present invention. The vehicle docking device is designated generally by reference numeral 20 in FIG. 1. Within FIG. 1, hitch ball 22 is supported upon a tow bar 24 secured to the rear end of the towing vehicle (not shown). Referring briefly to FIGS. 3 and 9, the lower end of hitch ball 22 includes an externally threaded lower end 30 adapted to be passed through aperture 32 within tow bar 24 and secured thereto with a hex nut 34.

Also shown within FIG. 1 is a trailer hitch, or towing hitch, 26 extending from the front end of the trailer or other vehicle to be towed (not shown). Trailer hitch 26 includes a ball-receiving socket 28. As will be appreciated by those skilled in the art, ball-receiving socket 28 is adapted to receive hitch ball 22 to form a mating, pivoting connection therebetween in order to couple the towing vehicle to the trailer or other vehicle to be towed.

Within FIG. 1, vehicle docking device 20 includes a square-shaped housing 36 formed of wood, plastic, metal, or the like. Housing 36 includes a substantially planar surface 38 which, in FIG. 1, faces the ground and lies in a substantially horizontal plane. Disposed upon surface 38 is a matrix 39 of sensors, including those shown in FIG. 1 as 40, 42, and 44. Within the embodiment shown in FIG. 1, sensor matrix 39 includes a total of nine such sensors arranged in an array of three rows and three columns, such that three such sensors lie in each row, and three such sensors lie in each column. Each of the sensors lies in a substantially common plane, i.e., the horizontal plane containing surface 38. While the sensor matrix 39 is not fully visible within the side view illustrated in FIG. 1, the arrangement of such sensors resembles the pattern and arrangement shown in FIG. 9, described in greater detail below. The respective rows and columns of sensors within sensor matrix 39 extend substantially perpendicular to each other. Sensor matrix 39 includes a center point, corresponding to the central sensor shown in FIG. 9; this center point preferably corresponds with the center of the surface 38 of housing 36.

Within the first embodiment illustrated in FIG. 1, each of sensors 40, 42, and 44 within sensor matrix 39 is a magnetically-actuated electrical switch. Such magnetic sensor switches may be of the type commercially available from Tandy Corporation through its Radio Shack retail outlets under part number 49-496. Each such switch is normally an open circuit. However, when a sufficient magnetic field is directed at one of such sensors, the affected sensor becomes a closed circuit, electrically coupling the terminals thereof. Referring to the electrical schematic shown in FIG. 5, the sensor matrix 39' is shown in abbreviated form as including magnetic sensor switches 40' and 42', corresponding to magnetic sensors 40 and 42, respectively, shown in FIG. 1. As shown in FIG. 5, magnetic sensor switch 40' is normally an open circuit relative to associated electrical terminals 46 and 48. In the presence of a magnetic field, magnetic sensor switch 40' closes, electrically coupling associated terminals 46 and 48. For present purposes, the coupling of terminals 46 and 48 is regarded herein as being equivalent to the generation of an electrical signal.

As shown in FIGS. 1 and 4, sensor matrix housing 36 may include a support tube 50, the lower end of which is secured to housing 36 Support tube 50 preferably has an inner diameter that is in excess of both the external diameter of threaded end 30 of hitch ball 22, and in excess of the largest cross-sectional dimension of hex nut 34, for allowing the upper end 52 of support tube 50 to extend around hex nut 34. As shown in FIG. 4, the internal cross-section of support tube 50 may be hexagonal to mate with hex nut 34. A threaded hex-head bolt 54 extends through the wall of support tube 50 for releasably clamping upper end 52 of support tube 50 to hex nut 34. In this manner, housing 36 of sensor matrix 39 may be quickly and conveniently mounted directly below hitch ball 22, with the center point of sensor matrix 39 vertically aligned with hitch ball 22, and with surface 38 disposed parallel to the ground in a substantially horizontal plane.

Referring jointly to FIGS. 1 and 2, the vehicle docking device 20 also includes an activating mechanism in the form of a magnet 56 for activating a selected one of the magnetic sensor switches within sensor matrix 39. Magnet 56 is supported by a base unit 58 which rests upon the ground. As shown in FIG. 1, base unit 58 is positioned directly below the ball-receiving socket 28 of trailer hitch 26, as designated by dashed line 60 within FIG. 1. Within FIG. 1, the desired final position of hitch ball 22 is indicated by phantom line position 62. In this position, hitch ball 22 is directly below the ball-receiving socket 28 of trailer hitch 26, and dashed line 60 will pass directly through the center point of sensor matrix 39, thereby activating the magnetic sensor switch located at such center point. Thus, when hitch ball 22 is aligned with ball-receiving socket 28, magnet 56 is also aligned with the center point of sensor matrix 39.

Different towing vehicles may have different bumper heights and chassis heights. Accordingly, the height of hitch ball 22 may vary significantly from vehicle to vehicle, and the elevation of sensor matrix 39 may also therefore vary. Thus, it is desirable to include within base 58 a means for adjusting the height of magnet 56 to suit towing vehicles of different heights. Consequently, base 58 is preferably formed with an upwardly-opening threaded bore 64; magnet 56 is secured to a rotatable knob 66 having a downwardly depending threaded shaft 68 adapted to threadedly engage bore 64 of base 58. The user may conveniently rotate knob 66 to adjust the height of magnet 56 relative to sensor matrix 39 so that the magnetic sensor switches pass approximately one-quarter inch above the upper end of magnet 56.

As shown in FIGS. 1 and 9, the rows and columns of sensors are spaced apart from one another. When magnetically-activated sensor switches are used, the spacing between two adjacent rows and/or two adjacent columns ranges approximately between one inch to four inches, depending upon the sensitivity of the sensors, and upon the strength and concentration of the magnetic field used to activate such sensors.

As shown in FIGS. 1 and 5, vehicle docking device 20 further includes a housing 70 having an indicator panel 72. Disposed upon indicator panel 72 are a matrix of indicators, designated generally by reference numeral 74. Like sensor matrix 39, indicator matrix 74 includes nine visual indicators arranged to lie within three rows and three columns, the rows and columns extending perpendicular to one another, respectively. As shown in FIG. 1, a ribbon cable 76 extends between sensor housing 36 and indicator housing 70 for electrically coupling sensor matrix 39 to indicator matrix 74. Preferably, the ends of ribbon cable 76 are provided with multiple terminal connector plugs, such as 78 and 80, adapted to mate with corresponding multiple terminal connector sockets (not shown) provided within sensor housing 36 and indicator housing 70 for allowing ribbon cable 76 to be disconnected at one or both ends when the vehicle docking device is not in use. For example, after the hitch ball and trailer hitch have been mated, ribbon cable 76 may be disconnected from the sensor housing and retrieved within the towing vehicle, while leaving the sensor housing secured to the hitch ball 22 for use at a later date.

Referring jointly to FIGS. 1 and 5, indicator matrix 74 includes nine visual indicators, including those designated 82, 84 and 86. Within the embodiment of the present invention shown in FIGS. 1 and 5, visual indicators 82 and 84 may be conventional low voltage incandescent light bulbs, such as 12 volt low amperage light bulbs. Light bulb 86, located at the center of indicator panel 72, is preferably of a green color; light bulb 86 is responsive to the magnetic sensor switch disposed at the center of sensor matrix 39, and when illuminated, indicates that hitch ball 22 is properly aligned with the ball-receiving socket of trailer hitch 26.

Turning to FIG. 5, ribbon cable 76 includes at least nine wires, one for each of the nine indicators within indicator matrix 74. As shown in FIG. 5, a first such wire 88 electrically couples a first terminal of light bulb 82 to terminal 46 of magnetic sensor switch 40'. Second terminal 48 of magnetic sensor switch 40' is coupled to ground potential. The second terminal of light bulb 82 is coupled to the positive terminal of battery 90, the negative terminal of which is also coupled to ground potential. Thus, wire 88 couples magnetic sensor switch 40' in series with light bulb 82 with battery 90 for causing an electrical current to flow through light bulb 82 when magnetic sensor switch 40' is closed due to the presence of magnet 56 (see FIG. 1). If desired, a master on/off switch (not shown) may be inserted in series between the positive terminal of battery 90 and the array of indicators to conserve the battery when vehicle docking device 20 is not in use.

The ground potential connections shown in FIG. 5 may be coupled to the chassis of the towing vehicle; the sensor matrix 39 may be electrically coupled with the chassis ground of the towing vehicle via support tube 50, which is intimate electrical contact with hitch ball 22 and tow bar 24. The negative terminal of battery 90 may be electrically coupled to chassis ground through a coupling wire (not shown) extending from the indicator matrix housing 70 and connected to a ground terminal within the towing vehicle. However, in the preferred embodiment, a tenth ground wire extends within ribbon cable 76 to effect a direct ground coupling between sensor matrix 39 and indicator matrix 74.

Power supply 90 may be a low-voltage battery separate and apart from the conventional automotive battery located under the hood of the towing vehicle, and may be housed within indicator matrix housing 70. For example, battery 90 may consist of two 1.5 volt battery cells coupled in series to provide a 3 volt battery supply. Battery 90 may instead be the conventional 12 volt automotive battery located under the hood of the towing vehicle; in this event, a coupling wire (not shown) may extend from indicator matrix housing 70 to a battery terminal upon the fuse panel of the towing vehicle. As an alternative, the coupling wire may terminate in an adapter for insertion into the cigarette lighter of the towing vehicle.

As shown in FIG. 5, each of light bulbs 82 and 84, (as well as each of the remaining indicators) is electrically coupled to a corresponding one of the magnetic sensor switches within sensor matrix 39. Each of such light bulbs is responsive to its corresponding magnetic sensor switch for illuminating when the magnetic switch is closed for providing a visual indication to the driver of the towing vehicle when the corresponding sensor is activated While the visual indicators shown in FIG. 5 are schematically illustrated as light bulbs, light-emitting-diodes (LEDs) may also be used. In this instance, current limiting resistors (not shown) can be inserted in series with such light-emitting-diodesto limit the current flowing therethrough when the corresponding magnetic sensor switch is closed. For example, the central indicator 86 may be a green light-emitting-diode of the type commercially available from Tandy Corporation through its Radio Shack retail outlets under part number 276-022. The surrounding indicators, including indicators 82 and 84 may be red light-emitting-diodes of the type commercially available from Tandy Corporation through its Radio Shack retail outlets under part number 276-041.

The use of magnetically-activated sensor switches within sensor matrix 39 provides a number of distinct advantages. First, such sensors are virtually immune to ambient conditions. Secondly, such sensors are rugged, waterproof, and may even be used in the rain without being degraded. Third, such sensors are binary in nature, either being open or closed; accordingly, the associated indicator lights are either fully on or fully off. Lastly, such sensors may be activated by a simple magnet which does not require its own separate electrical power source.

While the number of rows and columns of both sensors and indicators has been described as three each (hence forming 3-by-3 arrays), the number of rows and columns may be expanded (to 5-by 5 arrays or greater), either to cover a larger area or to provide greater refinement of the current position of the hitch ball relative to the towing hitch. However, the number of rows and columns are each preferably maintained as an odd number, whereby a sensor will be located at the center point of the sensor matrix, and a corresponding indicator will be located at the center point of the indicator panel, to confirm that the hitch ball is properly aligned with the towing vehicle. Within FIG. 3, another embodiment of a mounting clamp is shown for quickly mounting the sensor matrix housing 36 below hitch ball 22. Bracket 35 extends upwardly from sensor matrix housing 36 (see FIG. 6) in substitution for the support tube 50 shown in FIG. 1. A generally U-shaped clamp 37 includes a pair of opposing arms 39 and 41 adapted to extend around and grasp hex nut 34. The projecting ends of arms 39 and 41 include inwardly projecting rounded surfaces 43 and 45, respectively, to facilitate the passage of arms 39 and 41 around hex nut 34, and to help retain arms 39 and 41 about hex nut 34. Clamp 37 may be easily removed from hex nut 34 after the hitch ball has been aligned with the towing hitch.

FIGS. 6 and 7 illustrate a vehicle docking device 120 constructed in accordance with a second embodiment of the present invention wherein light-activated photosensitive elements are substituted for the magnetically activated sensor switches described above, and wherein a focused light beam is substituted for the activating magnet described above in order to activate a selected one of the photosensors. In FIG. 6, sensor housing 136 is configured similar to sensor housing 36 of FIG. 1. Disposed upon the lower planar surface 138 of sensor housing 136 is a 3-by-3 matrix of photosensitive elements, such as those shown as 140, 142, and 144. While photosensors responsive to visible light, such as conventional Cadmium Sulphide photoresistors, may be used, such sensors are sometimes activated by ambient light, especially on bright, sunny days. Accordingly, in a preferred embodiment, such photosensors are selected to be of the type primarily responsive to a source of infrared light. Such photosensors may, for example, be infrared variable resistance photosensors. Such photosensors exhibit a relatively high resistance between their terminals when not exposed to infrared light. However, when such devices are exposed to a source of infrared light, the resistance associated with such devices dramatically decreases, allowing such devices to become relatively conductive, and to conduct an electrical current of sufficient magnitude to illuminate a small light-emitting diode.

Still referring to FIG. 6, the vehicle docking device 120 shown therein includes an infrared light transmission source 155 including a base 158 adapted to rest upon the ground, a light guidance tube 156, a source of infrared light 157, and a power supply 159. Infrared light source 157 and power supply 159 may be housed within base 158, as shown. Power supply 159 may be a conventional battery or a rechargeable battery. Light guidance tube 156 may, if desired, include a lens to further focus the infrared light beam, indicated within FIGS. 6 and 7 by dashed line 161.

As in the case of magnet 56 shown in FIG. 1, the height of the upper end of light guidance tube 156 may be adjustable to account for towing vehicles of different bumper heights and chassis heights. Light guidance tube may include a rotatable knob 166 and a lower externally-threaded end 168 for threadedly engaging a threaded hole formed in the upper end of base 158. Rotation of knob 166 causes the upper end of light guidance tube to be raised or lowered, depending upon the direction of rotation Infrared transmission source 157 may be secured to lower end 168 of light guidance tube 156 for being raised or lowered therewith. As indicated, light guidance tube 156 provides an elongated, continuous channel 163 through which infrared light is guided upwardly along beam 161 toward the ball-receiving socket 28 of trailer hitch 26. Preferably, the height of the upper end of light guidance tube 156 is adjusted to lie from one to four inches below the elevation of planar surface 138 of sensor housing 136.

Within FIG. 7, infrared photosensor 140 of FIG. 6 is shown as a variable resistor 140' coupled between ground potential and wire 188 of ribbon cable 176. The opposite end of wire 188 (not shown) is coupled in series between a light-emitting-diode and the positive terminal of a battery within an indicator panel (not shown), similar to the indicator panel and indicator matrix shown in FIG. 5 already discussed above. Similarly, each of the other eight photosensors is series-coupled to another indicator within the indicator matrix. When struck by infrared beam 161, the intercepted photosensor becomes a relatively conductive path to ground potential, thereby permitting current to flow from the battery through an associated light-emitting-diode within the indicator matrix, in the manner described above relative to FIG. 5.

To further minimize false triggering of infrared sensor matrix 239 due to ambient infrared light, the transmitted infrared light beam may be frequency modulated to output pulses of infrared light at a periodic frequency, e.g., at 40 kiloHertz, a frequency often used in remote-control infrared links between television receivers and related hand-held remote control units.

In this event, the infrared sensor matrix includes a 3-by-3 array of infrared detectors, each including therein a bandpass filter tuned to 40 kiloHertz for generating an electrical signal when activated by the 40 kHz infrared light beam. Such a system provides improved rejection of ambient infrared light, though adding somewhat to the cost of the vehicle docking device. Modulated infrared light sources, and infrared detectors including bandpass filters responsive thereto, are readily available commercially. For example, such detectors may be of the type commercially available from Tandy Corporation through its Radio Shack retail outlets under part number 276-137. The use of such detectors within the sensor matrix requires that a positive voltage supply line be provided within the sensor matrix housing to actively power such infrared detectors. Accordingly, ribbon cable 76, shown within FIG. 5, would need to include an additional positive voltage supply conductor for coupling the positive terminal of battery 90 thereto.

FIGS. 8 and 9 illustrate an alternate embodiment of the infrared sensor device described in conjunction with FIGS. 6 and 7. Within FIGS. 8 and 9, vehicle docking device 220 includes a sensor housing having a lower base 236 and an upper hinged cover 235. Upper surface 238 of sensor housing base 236 has disposed thereupon an infrared photosensor matrix 239 arranged as a 3-by-3 array of infrared photosensors, including those designated 240, 242, and 244. Photosensor matrix 239 also includes photosensor 241 disposed at the center point of sensor matrix 239. Ribbon cable 276 electrically couples the photosensor matrix to the indicator matrix (not shown) in the same manner as described above. Hinged cover 235 may be rotated over lower base 236 to shield photosensor matrix 239 when vehicle docking device 220 is not in use.

Flange 250 extends laterally from base 236 parallel to planar surface 238 thereof, and has an aperture 251 formed therein. The aperture 251 formed in flange 250 is of the same diameter as hole 32 within tow bar 24 for allowing the lower threaded end 30 of hitch ball 22 to extend therethrough. Thus, the sensor housing may be easily and quickly secured to the towing vehicle by simply removing the hex nut 34 that normally secures hitch ball 22, passing lower end 30 of hitch ball 22 through aperture 251 of flange 250 and re-securing hex nut 34 over threaded end 30 of hitch ball 22. As shown, a split-ring lock washer 231 may also be used to prevent hex nut 34 from loosening. Removal of the sensor housing is also easily accomplished merely by reversing the above-described steps.

As shown in FIG. 8, an infrared light source 255 is secured to trailer hitch 26 for directing an infrared light beam 261 downwardly toward the ground. It will be noted that mounting flange 250 displaces the center point of the sensor matrix 239 from hitch ball 22 by a predetermined horizontal offset distance, i.e., sensor 241 lies an offset distance behind hitch ball 22. It will also be noted that infrared transmitter 255 is laterally offset from ball-receiving socket 28 of trailer hitch 26 by the same lateral offset distance, i.e., infrared beam 261 lies behind ball-receiving socket 28 by the same offset distance. Accordingly, when hitch ball 22 lies directly below the ball-receiving socket 28 of trailer hitch 26, infrared beam 261 will intercept photosensor 241 at the center point of sensor matrix 239 to indicate proper alignment.

Within FIG. 10, alternate means are shown for mounting the sensor matrix from hitch ball 22, and for supporting the activator from trailer hitch 26. Sensor matrix housing 436 includes an upper planar surface 438 upon which the sensor matrix 439 is disposed. The forwardmost edge of sensor housing 436 includes an inverted cup-shaped socket 450 adapted to receive hitch ball 22 therein. Thumbscrew 454 extends through socket 450 for bearing against hitch ball 22 to clamp socket 450 thereto. An optional bubble level 451 may be provided along the side of sensor housing 436 for indicating whether upper surface 438 lies in a horizontal plane. Socket 450 may be considered a surrogate socket, as it simulates the ball-receiving socket of trailer hitch 26.

Also shown within FIG. 10 is an activator 456, such as a magnet, light source, or other device for activating sensor matrix 439. Activator 456 is supported by a support bracket 458 which includes a surrogate ball 457. Surrogate ball 457 has dimensions similar to that of hitch ball 22 for being received and secured within ball-receiving socket 28 of trailer hitch 26.

The manner in which each of the aforementioned embodiments of the invention is used to dock the towing vehicle with the trailer is generally the same. After securing the sensor matrix to the hitch ball, the user extends ribbon cable 76 into the towing vehicle, and positions the indicator panel 72 in the driver's compartment, either upon the dashboard or at another convenient location. The user then positions the activator, such as magnet 56, either upon the ground (see FIG. 1) or supports the same from the trailer hitch (see FIG. 10) in such manner that the activator will lie adjacent the center point of the sensor matrix when the hitch ball 22 is aligned with the ball-receiving socket 28 of trailer hitch 26. The user then begins to back the towing vehicle toward the trailer. As the hitch ball approaches the trailer hitch, one of the indicators in the rearmost row of indicators will come within the influence of the activator; in turn, one of the lowermost indicators in the indicator panel will illuminate, simultaneously warning the driver that the hitch ball is slightly forward of the trailer hitch and further advising the driver whether the hitch ball is centered with, to the left of, or to the right of, the trailer hitch.

If the lefthand indicator lamp within the lowermost row of indicators illuminates, then the driver can continue backing while turning the steering wheel to the left. If the righthand indicator lamp within the lowermost row of indicators is lit, then the driver can continue backing while turning the steering wheel to the right. If the center indicator lamp within the lowermost row of indicators illuminates, then the driver can continue backing while maintaining the steering wheel relatively straight. The driver continues backing while watching the indicator panel until one of the center row of indicators is illuminated. If the center indicator is lit, then proper alignment has been achieved and the towing vehicle is stopped; if not, then the driver may pull forward and repeat the process until proper alignment is achieved.

If the driver inadvertently backs up too far, one of the upper row of indicator lights will become lit, alerting the driver to immediately stop and pull forward. In addition, depending upon whether the left, center or right indicator of the upper row is lit, the driver can determine in which direction to turn the steering wheel as the towing vehicle is pulled forward.

Those skilled in the art will now appreciate that an improved vehicle guidance device has been described which is of inexpensive construction and which assists the driver of the towing vehicle in visualizing the relative position of the hitch ball and the trailer hitch. The vehicle guidance device provides the driver with advance warning that the hitch ball is approaching the trailer hitch and indicates whether corrective steering action is required as the driver continues to slowly back the towing vehicle toward the trailer. The components forming the described vehicle guidance device are quickly and conveniently positioned or secured in place and may be easily removed after proper alignment has been achieved.

While the present invention has been described with reference to preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. A vehicle docking device for assisting the driver of a towing vehicle in positioning a hitch ball of the towing vehicle relative to a towing hitch of a trailer to be towed, said vehicle docking device comprising in combination:
   a. a matrix of sensors spaced apart from one another and disposed in a substantially common plane, said matrix of sensors being arranged to lie substantially in a plurality of rows and columns, said plurality of columns lying substantially perpendicular to said plurality of rows, said matrix having a center point, each of said sensors being adapted to generate an electrical signal when activated;
   b. mounting means for securing said matrix of sensors proximate said hitch ball and for positioning the common plane of said matrix of sensors in a substantially horizontal plane;
   c. activator means for activating a selected one of said sensors when said activator means is substantially aligned with said selected sensor;
   d. support means for supporting said activator means in a predetermined position relative to said towing hitch, said predetermined position being aligned with the center point of said matrix of sensors when said hitch ball is aligned with said towing hitch;
   e. a matrix of indicators for being viewed by the driver of the towing vehicle, said matrix of indicators being arranged to lie substantially in a plurality of rows and columns, said plurality of columns lying substantially perpendicular to said plurality of rows, each of said indicators being responsive to the electrical signal generated by a corresponding one of said sensors for providing a visual indication to the driver when the corresponding sensor is activated; and
   f. means for electrically coupling said matrix of indicators to said matrix of sensors.

2. The vehicle docking device recited by claim 1 wherein said sensors are magnetically-activated electrical switches, and wherein said activator means is a magnet.

3. The vehicle docking device recited by claim 1 wherein said sensors are light-activated photosensitive elements, and wherein said activator means is a beam of light.

4. The vehicle docking device recited by claim 3 wherein said light-activated photosensitive elements are responsive to infrared light, and wherein said beam of light is an infrared light source.

5. The vehicle docking device recited by claim 3 wherein said light-activated photosensitive elements are photosensitive resistors which become relatively conductive when illuminated by said beam of light.

6. The vehicle docking device recited by claim 5 wherein said electrical coupling means includes wiring coupling each of said photosensitive elements in series between a battery and a corresponding one of said indicators for causing an electrical current to flow through a selected indicator when the corresponding photosensitive element is illuminated by said beam of light.

7. The vehicle docking device recited by claim 2 wherein said electrical coupling means includes wiring coupling each of said magnetically-activated electrical switches in series between a battery and a corresponding one of said indicators for causing an electrical current to flow through a selected indicator when the corresponding magnetically-activated electrical switch is proximate said magnet.

8. The vehicle docking device recited by claim 1 wherein said indicators are light-emitting diodes.

9. The vehicle docking device recited by claim 1 wherein the number of sensors lying in each of said rows is an odd number, and wherein the number of sensors lying in each of said columns is an odd number, and wherein one of said sensors lies at the center point of said matrix of sensors, and wherein the illumination of the indicator disposed at said center point confirms that said hitch ball is properly aligned with said towing hitch.

10. The vehicle docking device recited by claim 1 wherein said mounting means secures said matrix of sensors below said hitch ball, and wherein said support means includes a base adapted to rest upon the ground for supporting said activator means in the predetermined position below said towing hitch.

11. The vehicle docking device recited by claim 10 wherein said mounting means causes the center point of said matrix of sensors to be supported directly below said hitch ball, and wherein the base of said support means is positioned upon the ground for supporting said activator means directly below said towing hitch.

12. The vehicle docking device recited by claim 10 wherein said support means includes height-adjustment means for supporting said activator means at an adjustable distance above the ground.

13. The vehicle docking device recited by claim 1 wherein the hitch ball has associated therewith a lowermost hex nut for securing the hitch ball to the towing vehicle, and wherein said mounting means includes a clamp for releasably engaging the lowermost hex nut in order to secure said matrix of sensors below said hitch ball.

14. The vehicle docking device recited by claim 1 wherein said mounting means includes surrogate socket means for engaging the hitch ball and securing said matrix of sensors thereto.

15. The vehicle docking device recited by claim 1 wherein the towing hitch includes a ball-receiving socket, and wherein said support means includes surrogate ball means for being secured within the ball-receiving socket of said towing hitch to support said activator means therefrom.

16. The vehicle docking device recited by claim 1 wherein the towing hitch includes a ball-receiving socket, and wherein said mounting means laterally displaces the center point of said matrix of indicators in a horizontal direction from the hitch ball by an offset distance, and wherein said support means laterally displaces said activator means from the ball-receiving socket of said towing hitch in the same horizontal direction by the same offset distance.

* * * * *